(12) United States Patent
DeWald

(10) Patent No.: US 6,736,544 B1
(45) Date of Patent: May 18, 2004

(54) VEHICLE DIFFERENTIAL AND METHOD

(75) Inventor: Gregory T. DeWald, Mooresville, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/160,457

(22) Filed: May 31, 2002

(51) Int. Cl.[7] ............................................. F16C 43/04
(52) U.S. Cl. .................. 384/626; 384/562; 384/583; 29/898.09
(58) Field of Search .................. 384/626, 584, 384/585, 583, 559, 562; 29/898.06, 898.07, 898.09

(56) References Cited

U.S. PATENT DOCUMENTS

| | | | |
|---|---|---|---|
| 2,018,188 A | * 10/1935 | Padgett et al. | ............. 184/11.1 |
| 2,731,855 A | 1/1956 | Schmal | |
| 3,015,970 A | 1/1962 | Mueller | |
| 3,308,682 A | 3/1967 | Puidokas | |
| 3,323,844 A | 6/1967 | Hedstrom | |
| 4,733,578 A | 3/1988 | Glaze et al. | |
| 4,909,100 A | 3/1990 | Takagi et al. | |
| 5,125,156 A | * 6/1992 | Witte | ........................ 29/898.09 |
| 6,088,910 A | * 7/2000 | Jerraid | .......................... 29/724 |
| 6,364,803 B1 | * 4/2002 | Barnholt et al. | ............. 475/246 |
| 6,544,140 B2 | * 4/2003 | Gradu et al. | ................. 384/585 |

* cited by examiner

Primary Examiner—Thomas R. Hannon
(74) Attorney, Agent, or Firm—Dykema Gossett PLLC (57) ABSTRACT

An improved method and structure for setting pinion bearing preload and fastener clamp load in a vehicle differential is provided. The apparatus and method provide a preload spacer readily accessible outboard of the pinion bearings and input yoke. Pinion bearing preload is set according to the present invention by the force of the pinion gear on the inner cone of an inner bearing and the force of an input yoke on the outer cone of an outer bearing. As a nut is torqued into contact with the input yoke, a preload spacer limits the movement of the nut as the input yoke engages the outer cone. This provides for consistent preload on the bearings and allows for increased clamp load for retaining the nut.

10 Claims, 5 Drawing Sheets

VEHICLE DIFFERENTIAL AND METHOD

FIELD OF INVENTION

The present invention relates to vehicle differentials, and specifically to an apparatus and method for setting pinion bearing preload and fastener clamp load.

BACKGROUND

A vehicle differential performs several functions. The differential turns the flow of power 90 degrees from the engine drive shaft to the vehicle wheels, reduces drive shaft revolutions to a useful wheel speed, and divides power between the rear wheels so one wheel can rotate at a different speed than the other such as when the outer wheel turns faster in order to go the long way around the outside of a curve while the inner wheel slows down to follow the shorter inside path. The differential includes a housing, a drive pinion extending into the housing with a pinion gear that engages a ring gear. The ring gear carries small pinions and side gear which are coupled to the axle shafts.

The pinion gear is supported by pinion bearings which are placed in a preloaded condition to maintain alignment of the pinion drive shaft during operation. Pinion bearings are supplied as two basic components, a cone assembly including a cone, also known as an inner race, a cage and rollers, and a cup also known as an outer race. Preload is a bearing setting in which there is no axial clearance in the bearing. The preloaded condition is achieved by tightening the bearing setting to have a slight amount of resistance to rotation. The greater the preload the more resistance to rotation. The pinion bearing preload is often confirmed by measuring the pinion bearing preload rolling torque according to methods well known in the art. Too much preload, and the bearings may wear prematurely, no preload and the bearings may allow play in the system. Thus, the desired level of pinion bearing preload in a differential can minimize shaft bending helping to maintain alignment between the pinion gear and ring gear, can reduce seal wear, and can reduce noise.

Various methods have been employed to set pinion bearing preload. One exemplary design is described in U.S. Pat. No. 3,308,682 entitled Differential Gear Assembly. This patent provides for a shim between an inner bearing and the housing, and an additional collapsible spacer inboard of an outer bearing and between the outer bearing and portion of the pinion shaft, both the shim and collapsible spacer being provided to set a desired pinion bearing preload. In this design, a nut is threaded onto the pinion drive shaft and into contact with a cone of the outer bearing. The torque applied to the nut is proportional the amount of preload developed on the bearings and axial force of the collapsible spacer, regardless of what torque is applied. Thus if the preload is too low, the nut is tightened further against the bearing, and if the preload is too high, the unit must be disassembled and reassembled with a new spacer. In either case, the nut is retained in place by the additional step of staking or crimping a circumferential flange of the nut to engage the splines of the drive pinion shaft.

A major difficulty encountered in such a design is retention of the nut preload force under heavy reversing loads. More specifically, heavy loads with shock often encountered in off highway applications tend to cause the nut to back off due to lack of adequate locking force. This allows the bearings to loosen and may result in earlier failure of components in the differential.

The inventor of the present invention has recognized the need for and has invented an improved apparatus and method for setting pinion bearing preload and improved nut locking force. The invention provides for consistent pinion bearing preload in initial manufacture of the differential, proper maintenance of pinion bearing preload over time, and ease of setting proper pinion bearing preload upon repair and re-assembly of the differential. The invention provides superior nut locking force which maintains proper bearing setting for the life of the design. The present invention addresses these needs and others.

SUMMARY OF INVENTION

The present invention provides a vehicle differential with an improved structure and method for setting pinion bearing preload and fastener clamp load. The apparatus and method utilize a preload spacer readily accessible outboard of an outer bearing set to limit the preload applied to an inner and outer bearing, and to allow for increased clamp load between a nut and a threaded shank extending from a pinion drive shaft.

A differential according to the present invention includes a housing, an inner bearing cup and outer bearing cup in direct contact with the housing. An inner cone assembly and outer cone assembly are supported within the inner bearing cup and outer bearing cup. A pinion drive shaft includes a shaft supported within the inner and outer cone assemblies, a pinion gear at a first end of the shaft in contact with the inner cone, and a shank extending from a shoulder at a second end of the shaft. The second end of the shaft extends outboard of the outer cone. An input yoke is coupled to the second end of the shaft between the outer cone and the shank and is in engagement with the outer cone. A nut is disposed about the shank and is in engagement with the input yoke and a preload spacer. The preload spacer is disposed between the nut and the shoulder, and serves to limit the movement of the nut against the input yoke, this provides for consistent displacement of the input yoke and pinion drive shaft relative to one another resulting in consistent preload on the pinion bearings and increased clamp load between the nut and shank. The present invention additionally provides a method for controlling pinion bearing preload in a differential.

Other aspects of the present invention are provided with reference to the following figures and detailed description of embodiments.

DETAILED DESCRIPTION

The present invention provides a vehicle differential with an improved structure and method for setting pinion bearing preload and fastener clamp load. The apparatus and method utilize a preload spacer readily accessible outboard of an outer bearing and input yoke. The spacer limits the preload applied to an inner and outer bearing, and allows for increased clamp load between a nut and a threaded shank extending from a pinion drive shaft.

Figure 1:
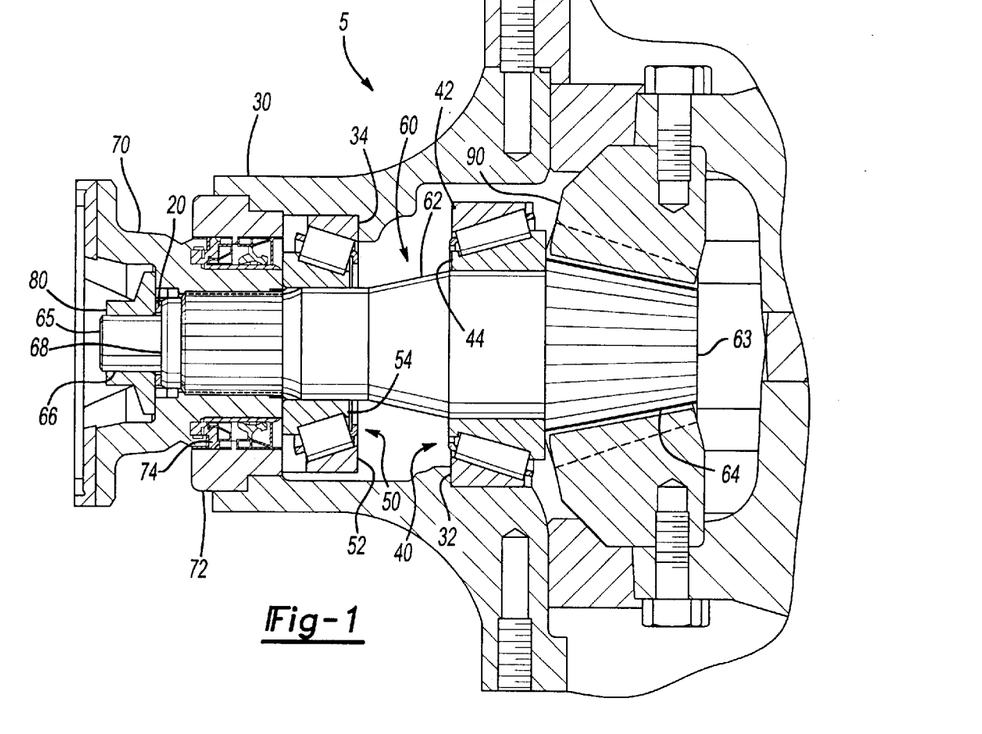
FIG. 1 illustrates an embodiment of a differential having pinion gears in preload.

FIG. 1 provides a differential according to the present invention. More specifically, a differential includes a housing 30, an inner bearing 40 having an inner cup 42 in direct contact with the housing 30 and an inner cone assembly 44 supported within the inner cup 42, an outer bearing 50 having an outer cup 52 in direct contact with the housing 30 and an outer cone assembly 54 within the outer cup 52, and a pinion drive shaft 60 having a shaft 62 supported by the inner cone assembly 44 and outer cone assembly 54. The pinion drive shaft 60 includes a shaft 62, a pinion gear 64 at a first end 63 of the shaft 62 in contact with the inner cone 44, and a shank 66 extending from a shoulder 68 at a second end 65 of the shaft 62. The second end 65 of the shaft 62 extends outboard of the outer cone assembly 54. A seal 74 and seal retainer 72 are mounted within the housing between the housing and an input yoke 70. The input yoke 70 is coupled to the second end 65 of the shaft 62 between the outer cone assembly 54 and the shank 66 and is in engagement with the outer cone assembly 54. A nut 80 is disposed about the shank 66 and is in engagement with the input yoke 70 and a preload spacer 20. The preload spacer 20 is disposed between the nut 80 and the shoulder 68, and serves to limit the movement of the nut 80 against the input yoke 70. A bearing seal retainer 72 and seal 74 are mounted between the housing 30 and the input yoke 70.

The pinion bearing preload of the present invention is attained by the force of the pinion gear 64 on the inner cone assembly 44 and the force of the yoke 70 on the outer cone assembly 54 as the nut 80 is torqued into engagement with both the preload spacer 20 and the input yoke 70. The force imposed by the relative displacement of the pinion gear 64 and input yoke 70 draws the inner cone assembly 44 and outer cone assembly 54 toward one another while the inner cup 42 and outer cup 52 remain in relative fixed contact with the housing 30. The preload spacer 20 against the shoulder 68 of the shaft 62 limits movement of the nut 80 as the nut 80 engages the input yoke 70, this provides for consistent displacement of the input yoke 70 and pinion drive shaft 60 relative to one another resulting in consistent preload on the pinion bearings 40, 50. During installation, a moderate torque applied to the nut 80 is sufficient to cause relative movement between the input yoke 70 and drive shaft 62 and to set the desired preload when the nut 80 is forced against the preload spacer 20. Any additional torque applied to the nut 80, results in increased clamp load between the shank 66 and nut 80 but does not significantly increase the pinion bearing preload. As the installation torque applied to the nut 80 is increased, an increasing percentage of the resulting axial force will be reacted between the nut 80 and shank 66 resulting in higher clamp load. Thus due to the configuration of the present invention, a much higher percentage of the axial force will be reacted between the nut 80 and shank 66 than between the pinion bearings 40, 50 and variations of nut torque will have little affect on the pinion bearing preload. Also as the torque is increased, the retention of the nut 80 on the shank 66 is improved due to the higher clamp load. The nut 80 will be less likely to back off the shank 66 due to vibration or wear of parts against each other. As a result, the preload will be more consistently set upon initial manufacture, will be more consistently maintained over time, and more consistently set during repair and re-assembly. Shaft bending is minimized, alignment between the pinion gear and ring gear is maintained, wear on the pinion gear and ring gear are reduced, seal wear is reduced, and noise emanating from the differential is reduced.

The preload on the pinion bearings 40, 50 may be easily adjusted by removing the nut 80, replacing the preload spacer 20 with a preload spacer 20 having a different height, and retorquing the nut 80. A taller preload spacer 20 will result in less preload and a shorter preload spacer 20 will result in more preload. Additionally, the arrangement of the preload spacer 20 outboard of the input yoke 70 and between the shoulder 68 and the nut 80, allows the preload to be adjusted without disassembly of any portion of the differential. Only the nut 80 is removed and the spacer replaced before the nut 80 is retorqued onto the shank 66. The preload is more easily and reliably adjusted and maintenance of the differential is improved as fewer components and fewer steps are involved with the adjustment.

According to one embodiment, the housing 30 additionally includes an inner radial wall 32 in direct contact with the inner bearing 40 and an outer radial wall 34 in direct contact with the outer bearing 50. The inner radial wall 32 faces the inboard direction and the outer radial wall 34 faces the outboard direction. In this embodiment, the inner wall and outer wall retain the inner bearing 40 and outer bearing 50 in fixed relation to the housing 30 when the forces are applied to the inner bearing 40 and outer bearing 50 between the pinion gear 64 and input yoke 70.

The preload spacer 20 is suitable for high torque levels, improving retention of the nut 80 on the shank 66. Because the nut 80 is installed directly against the preload spacer 20 and input yoke 70 instead of the outer cone assembly 54, the outer cone assembly 54 does not rotate as the torque level is increased, as is seen in known designs. Thus clamp load is not limited by the desired pinion bearing preload or by problems with rotation of the outer cone during assembly. The clamp load can be adjusted to any level required to prevent the nut from backing off under the forces of a particular application and at the same time, the height of the preload spacer can be adjusted to any height required to provide the desired pinion bearing preload. Thus, the retention of the nut 80 on the pinion drive shaft 60 is significantly improved. The increased clamp load achieve with this design provides superior nut locking force which can maintain the preload setting for the life of the design.

Figure 2:
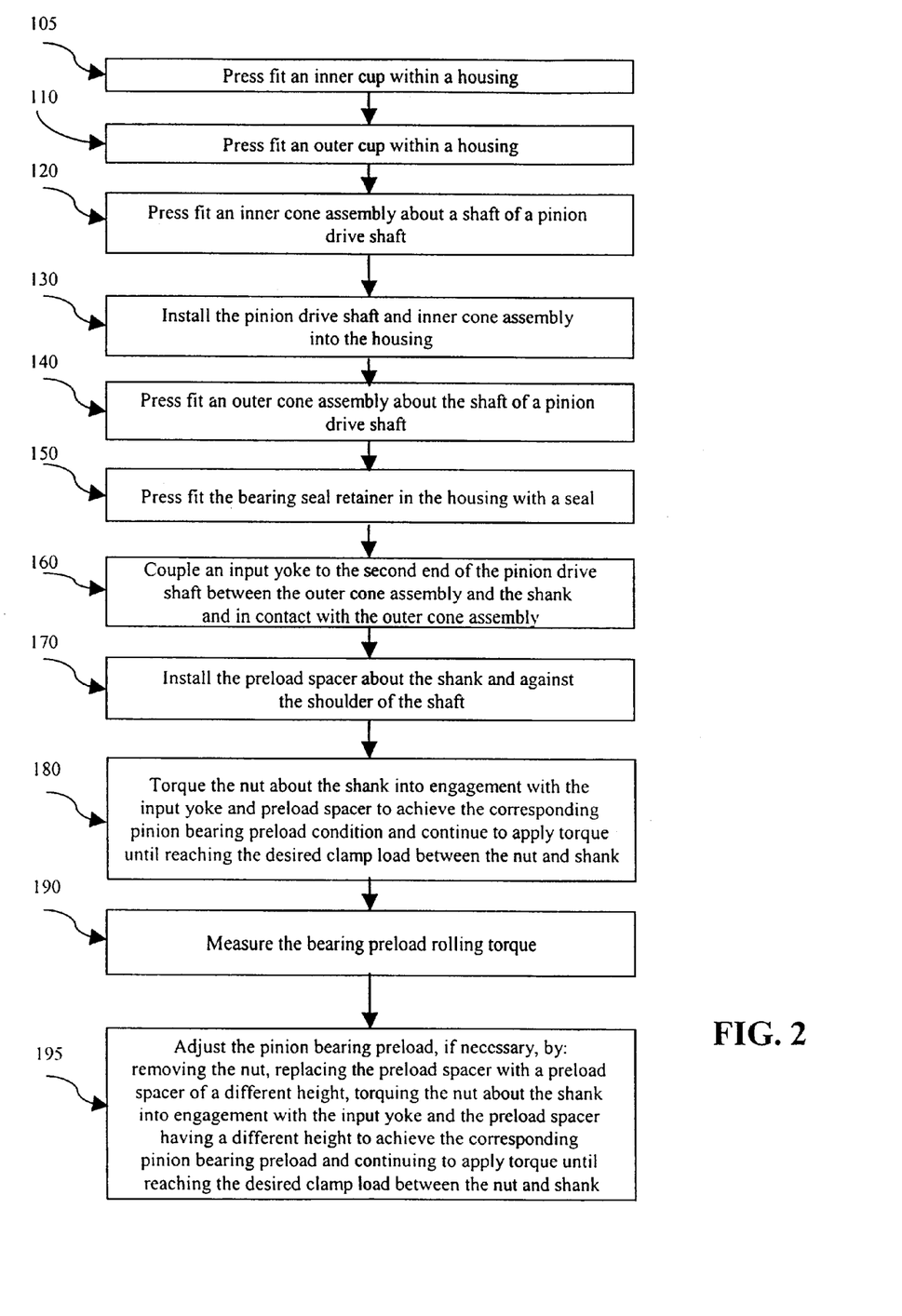
FIG. 2 illustrates an embodiment of a method for applying pinion bearing preload.

FIG. 2 illustrates a method for controlling pinion bearing preload and fastener clamp load in a differential assembly. More specifically, the method includes the following steps. Press fit an inner cup and outer cup within a housing 105, 110. Press fit an inner cone assembly about a shaft of a pinion drive shaft 120. Install the shaft and inner cone assembly into the housing 130 with the inner cone assembly supported within the inner cup. Press fit an outer cone assembly about a shaft of a pinion drive shaft 140. Press fit the bearing seal retainer in the housing with the seal between the retainer and an input yoke 150. Couple an input yoke to the second end of the pinion drive shaft between the outer cone assembly and the shank and in contact with the outer cone assembly 160. Install the preload spacer about the shank and against the shoulder of the shaft 170. Torque the nut about the shank into engagement with the input yoke and preload spacer to achieve the corresponding pinion bearing preload condition and continue to apply torque until reaching the desired clamp load between the nut and shank 180. Measure the bearing preload rolling torque 190 according to known methods. The pinion bearing preload may further be adjusted, if necessary by the following procedure: Remove the nut, and replace the preload spacer with a preload spacer of a different height, then torque the nut about the shank into engagement with the input yoke and the preload spacer having the different height to achieve the corresponding pinion bearing preload and continue to apply torque until reaching the desired clamp load between the nut and shank 195.

According to the method of FIG. 2, and with reference to the assembly shown in FIG. 1, as the nut 80 is torqued, the input yoke 70 contacts the outer cone assembly 54 and the pinion gear 64 contacts the inner cone 44. When the nut 80 is forced against the preload spacer 20, the desired pinion bearing preload is achieved and additional torque is applied until the desired clamp load between the shank 66 and nut 80 is achieved. Thus pinion bearing preload is limited by the height of the preload spacer 20, while the clamp load between the shank 66 and nut 80 is limited by the increased installation torque applied to the nut 80.

In addition, the step of providing the inner cup 42 and outer cup 52 in fixed relation to the housing 30 may comprise mounting the inner cup 42 in engagement with an inner radial wall 32 of the housing 30 and mounting the outer cup 52 in engagement with an outer radial wall 34 of the housing 30.

Preload spacer 20 has a height H chosen to provide the desired pinion bearing preload. According to one embodiment, height H may further comprise a matched height H' chosen to correspond to the tolerance stack up of a particular differential assembly 5. According to this embodiment, the matched height H' is defined at least in part by a measured height of the outer cone assembly 54 to be used in the differential assembly 5, where the height of the measured height of the outer cone assembly 54 is specified to be no greater than a maximum height and no smaller than a minimum height of outer cones to be used in production. Use of this matched height H' helps to assure consistent preload forces regardless of manufacturing variations in the height of the outer cone assembly 54 and other components in the differential assembly 5.

Figure 3:
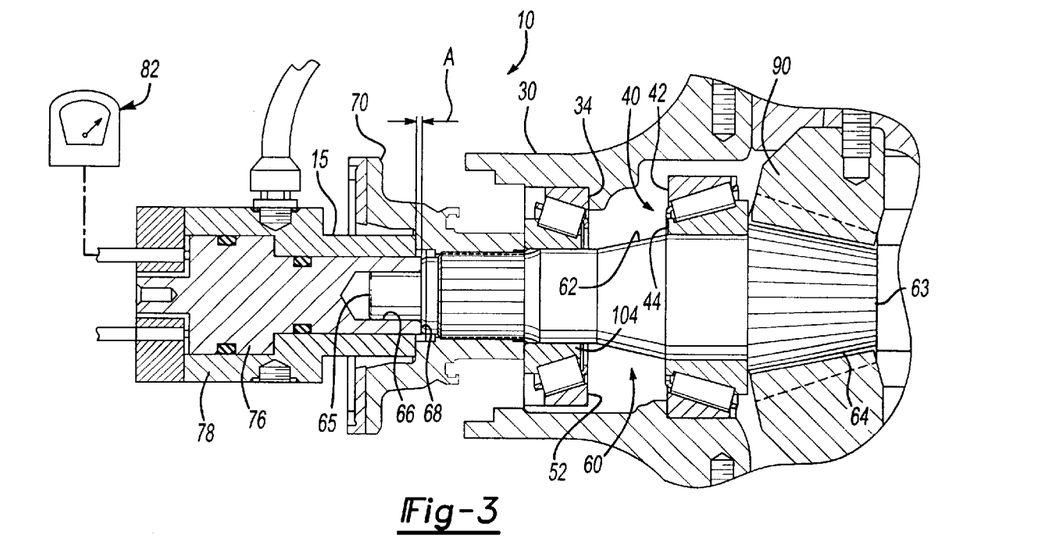
FIG. 3 illustrates an intermediate assembly used in a method according to the present invention.

FIG. 3 illustrates an embodiment of an intermediate differential assembly 10 for selecting a matched height H' for the preload spacer. The intermediate differential assembly 10 utilizes a master outer cone assembly 104, and a preloading tool 15 in an intermediate set of steps to determine the matched height H' of the preload spacer 20. The master outer cone assembly 104 has a height equal to the mean height of outer cone assemblies 54 supplied in production. Individual outer cone assemblies 54 will vary in height between a maximum and a minimum outer cone assembly 54 height, the mean value being the height of the master outer cone assembly 104.

The intermediate differential assembly 10 of FIG. 3 also includes: a housing 30, an inner bearing 40 having an inner cup 42 in direct contact with the housing 30 and an inner cone assembly 44 supported within the inner cup 42, an outer cup 52 in contact with the housing 30 and supporting the master outer cone assembly 104. A pinion drive shaft 60 having a shaft 62 supported by the inner cone assembly 44 and master outer cone assembly 104. The pinion drive shaft 60 includes a shaft 62, a pinion gear 64 at a first end 63 of the shaft 62 in contact with the inner cone 44, and a shank 66 extending from a shoulder 68 at a second end 65 of the shaft 62. The second end 65 of the shaft 62 extends outboard of the master outer cone 104. An input yoke 70 is coupled to the second end 65 of the shaft 62 between the master outer cone assembly 104 and the shank 66 and is in engagement with the master outer cone assembly 104. A preloading tool 15 is assembled into engagement with the input yoke 70 and shoulder 68, with an outer piece 78 in contact with the input yoke and an inner piece 76 in contact with the shoulder 68, hydraulic pressure forces the outer piece 78 against the input yoke 70 until achieving a desired pinion bearing preload condition. The distance A between the end of the preloading tool 15 in contact with the input yoke 70 and the shoulder 68 is measured. This distance can be displayed as shown with meter 82. The preloading tool 15, the input yoke 70, and the master outer cone assembly 104 are then removed.

Thus, in addition to the variation B in the height of the outer cone assembly 54 from the mean height of master outer cone assembly 104, the distance A can also be utilized to choose the matched height H' of the preload spacer 20. And according to one embodiment, an elasticity constant K may additionally be used in calculating the matched height H' of the preload spacer 20. Constant K may reflect the elongation of the bearing cone assembly 54 when press fit onto the shaft 62, so that the matched height is selected by summing the values of value A and B and then subtracting the value of K.

Figure 4:
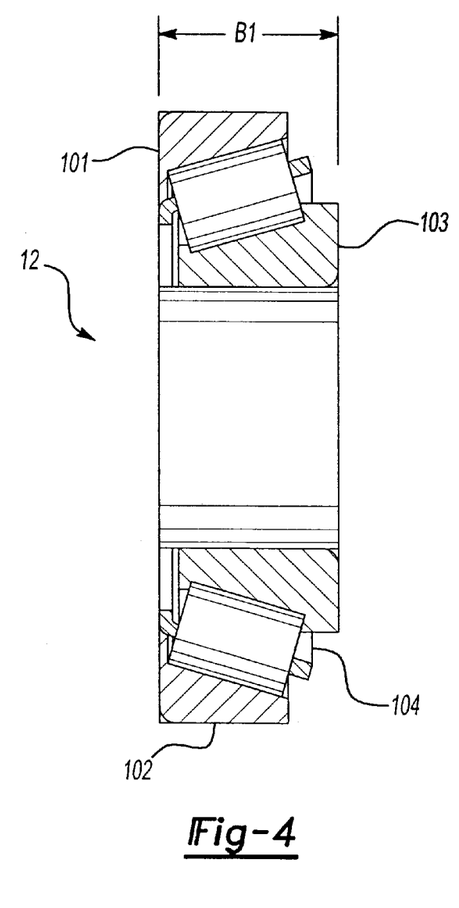
FIG. 4 illustrates an intermediate assembly used in a method according to the present invention.
Figure 5:
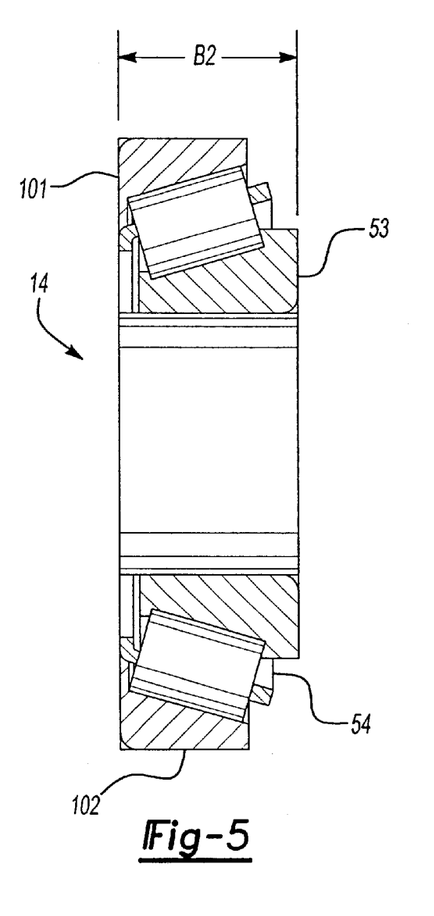
FIG. 5 illustrates an intermediate assembly used in a method according to the present invention.

FIG. 4 illustrates a first intermediate cone assembly 12 and FIG. 5 illustrates a second intermediate cone assembly 14 for determining the variation B between the height of the outer cone assembly 54 to be used in a final assembly and the mean height of the master outer cone assembly 104 used in the intermediate differential assembly 10. In FIG. 4 and FIG. 5, the master outer cup 102 has a height equal to the mean height of outer cups 52 supplied in production. Individual outer cups 52 will vary in height between a maximum and a minimum outer cup 52 height, the mean value being the height of the master outer cup 102. In FIG. 4, the height B1 of the master cup 102 and the master outer cone assembly 104 is measured between the outer side 103 of the master outer cone assembly 104 and the inner side 101 of the master outer cup 102. In FIG. 5, the height B2 of the master outer cup 102 and the outer cone assembly 54 to be used in the final assembly is measured between the outer side 103 of the outer cone assembly 54 and the inner side 101 of the master outer cup 102. The variation B in the height of the outer cone assembly 54 from the mean height of master outer cone assembly 104 is calculated as the difference between B1 and B2.

Figure 6:
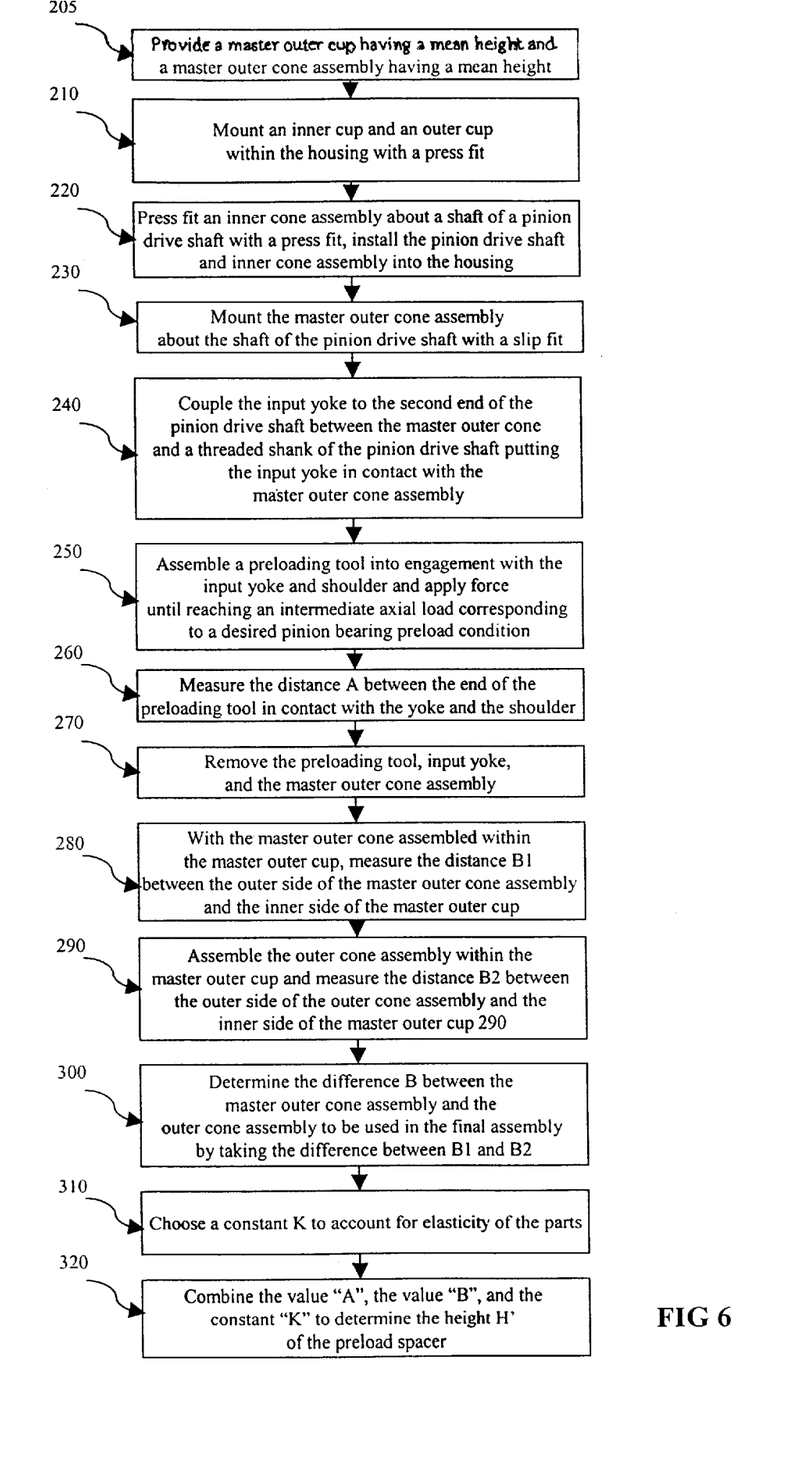
FIG. 6 illustrates an embodiment of a method for according to the present invention.

FIG. 6 provides a flow chart of the described method for determining the matched height H' of preload spacer in steps 205 through 320. The method for determining H' include the following steps. Provide a master outer cup having a mean height and a master outer cone assembly having a mean height 205. Mount an inner cup and an outer cup within the housing with a press fit 210. Press fit an inner cone assembly about a shaft of a pinion drive shaft, install the pinion drive shaft and inner cone assembly into the housing 220. Mount the master outer cone assembly about the shaft of the pinion drive shaft with a slip fit 230. Couple the input yoke to the second end of the pinion drive shaft between the master outer cone and a threaded shank of the pinion drive shaft putting the input yoke in contact with the master outer cone assembly 240. Assemble a preloading tool into engagement with the input yoke and shoulder, with an outer piece in contact with the input yoke and an inner piece in contact with the shoulder, and apply force until reaching an intermediate axial load corresponding to a desired pinion bearing preload condition 250. Measure the distance A between the end of the outer piece in contact with the input yoke and the end of the inner piece in contact with the shoulder 260.

Remove the preloading tool, input yoke, and the master outer cone assembly 270. Then on a stand, with the master outer cone assembled within the master outer cup, measure the distance B1 between the outer side of the master outer cone assembly and the inner side of the master outer cup 280. Then assemble the outer cone assembly within the master outer cup and measure the distance B2 between the outer side of the outer cone assembly and the inner side of the master outer cup 290. Determine the difference B between the master outer cone assembly and the outer cone assembly to be used in the final assembly by taking the difference between B1 and B2 300. In addition to the distance A, the variation B in the height of the outer cone assembly from the mean height of master outer cone assembly are then utilized to choose the matched height H' of the preload spacer. According to one embodiment, an elasticity constant K may additionally be used in calculating the matched height H' of the preload spacer 310. Constant K may reflect the elongation of the bearing cone assembly 54 when press fit onto the shaft, in which case the matched height is selected by summing the values of value A and B and then subtracting the value of K.

As described in this method, the matched height H' of the preload spacer 20 is selected by. combining the value B, the value A and the constant K 320. According to one embodiment, the preloading tool is assembled into engagement with the input yoke and force is applied to the yoke until reaching an intermediate clamp load of about 1000 lbs and distance A is then measured by the distance between the end of the inner piece 76 in contact with the shoulder and the end of the outer piece 78 in contact with the input yoke.

Figure 7:
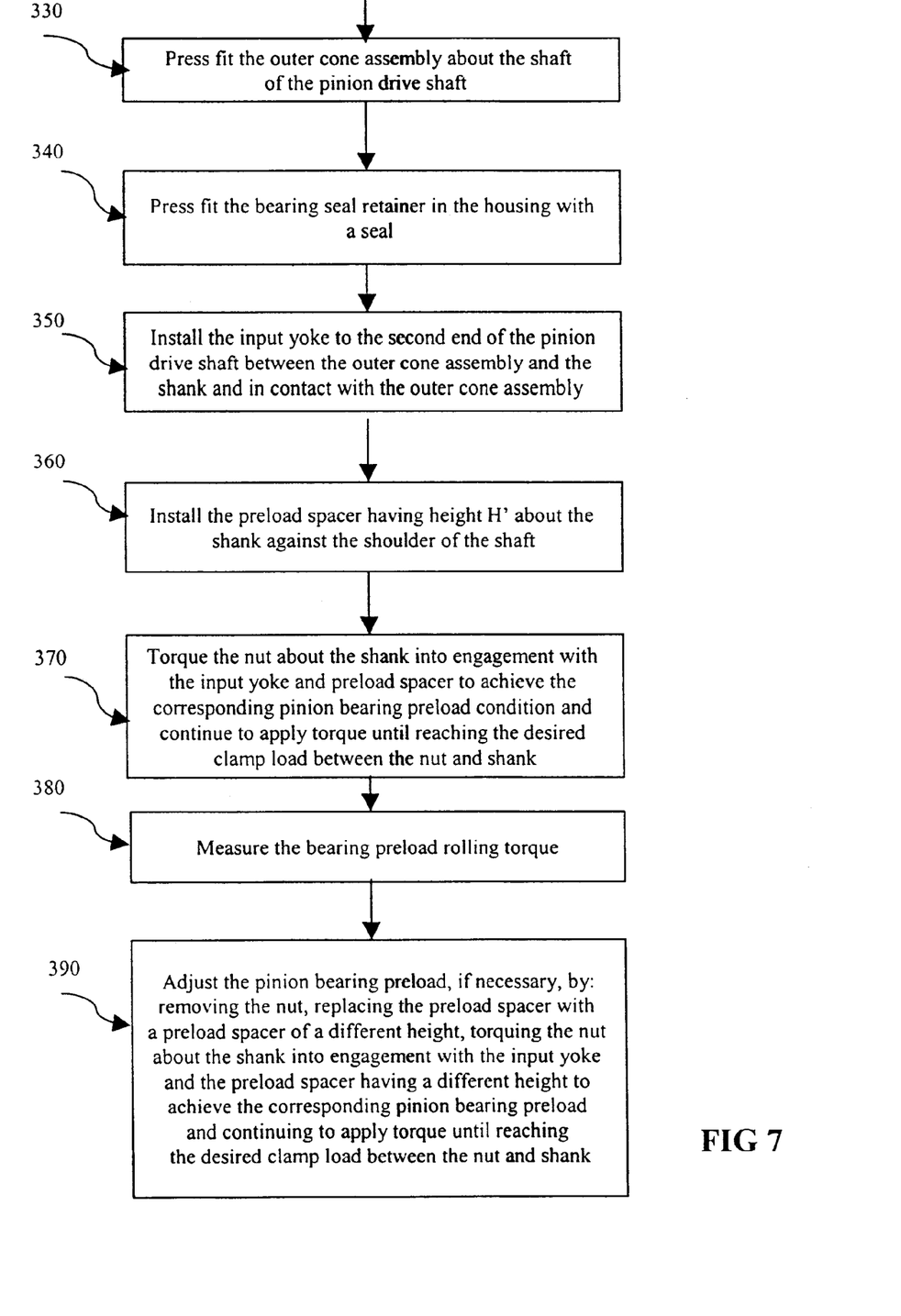
FIG. 7 illustrates an embodiment of a method for according to the present invention.

FIG. 7 additionally provides steps for the final differential assembly once the matched height H' of the preload spacer has been selected. These steps include: Replacing the master outer cone assembly with an outer cone assembly to be used in the final assembly by press fitting the outer cone assembly onto the shaft 330. Press fitting a bearing seal retainer into the housing including a seal 340. Installing the input yoke to the second end of the pinion drive shaft between the outer cone assembly and the threaded shank and in contact with the outer cone assembly 350. Installing the preload spacer having the matched height H' about the shank and against the shoulder of the shaft 360. Torquing the nut about the threaded shank into engagement with both the input yoke and matched preload spacer having height H' to achieve the corresponding pinion bearing preload condition and continuing to apply torque until reaching the desired clamp load between the nut and shank 370. Measure the bearing preload rolling torque 380 according to known methods. The pinion bearing preload may further be adjusted, if necessary by the following procedure: Remove the nut, and replace the preload spacer with a preload spacer of a different height, then torque the nut about the shank into engagement with the input yoke and the preload spacer having the different height to achieve the corresponding pinion bearing preload and continue to apply torque until reaching the desired clamp load between the nut and shank 390. The torque is applied until reaching a high clamp load between the nut and shank. This invention permits, but is not limited to, the application of clamp loads sufficiently high to withstand heavy shock loads such as typically seen in heavy duty and off-highway applications.

While the present invention has been described with reference to exemplary apparatuses and methods, modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A differential, comprising:

a housing;

an inner bearing having an inner cup mounted within the housing and supporting an inner cone assembly;

an outer bearing having an outer cup mounted within the housing and supporting an outer cone assembly;

a pinion drive shaft having a shaft supported by the inner cone assembly and outer cone assembly, a pinion gear at a first end of the shaft in engagement with the inner cone assembly, and a shank extending from a shoulder at a second end of the shaft;

an input yoke coupled to the second end of the shaft between the outer cone assembly and the shank and in engagement with the outer cone assembly;

a nut disposed about the shank and in engagement with the input yoke; and a preload spacer disposed between the nut and the shoulder outboard of the outer bearing; and wherein the preload spacer limits the relative movement between the input yoke and pinion drive shaft, limiting the force of the input yoke on the outer cone assembly and the pinion gear on the inner cone assembly and allowing increased clamp load between the shank and nut.

2. The differential of claim 1, the housing further comprising:

an inner radial wall;

an outer radial wall; and wherein the inner radial wall and outer radial wall retain the inner cup and outer cup in fixed axial relation to the housing when the preload forces are applied.

3. The differential of claim 1, wherein the preload spacer is adapted to withstand high axial loads.

4. The differential of claim 1, further comprising:

the outer bearing having a measured height; and the preload spacer forming a matched set with said outer bearing and having a height defined in part by the outer bearing set measured height.

5. A method of controlling pinion bearing preload in a differential, comprising:

press fitting an inner cup and an outer cup within a housing;

press fitting an inner cone assembly and an outer cone assembly about a shaft of a pinion drive shaft;

supporting the inner cone assembly within the inner cup and the outer cone assembly within the outer cup with a pinion gear at a first end of the shaft in contact with the inner cone assembly and with a shank and shoulder at a second end of the shaft extending outboard of the outer cone assembly;

press fitting a bearing seal retainer in the housing including a seal;

coupling an input yoke to the second end of the pinion drive shaft between the outer cone assembly and the shank putting the input yoke in contact with the outer cone assembly;

installing a preload spacer about the shank and against the shoulder of the shaft; and torquing a nut about the shank into engagement with the input yoke and the preload spacer to achieve the corresponding pinion bearing preload condition and continuing to apply torque until reaching the desired clamp load between the nut and shank.

6. The method of claim 5, further comprising adjusting the forces acting on the inner cone assembly and outer cone assembly by:

removing the nut from the shank;

replacing the preload spacer with a preload spacer having a different height; and retorquing the nut about the shank.

7. The method of claim 5, wherein press fitting the inner cup and outer cup within the housing comprises:

mounting the inner cup in engagement with an inboard side of an inner radial wall of the housing and mounting the outer cup in engagement with an outboard side of an outer radial wall of the housing.

8. The method of claim 5, further comprising the following method for selecting a height H' for the preload spacer:

providing a master outer cup having a mean height and a master outer cone having a mean height;

mounting an inner cup within a housing with a press fit and mounting an outer cup within the housing with a press fit;

press fitting an inner cone assembly about a shaft of a pinion drive shaft, installing the pinion drive shaft and inner cone assembly into the housing, and mounting the master outer cone assembly about the shaft of the pinion drive shaft with a slip fit, the a pinion gear at a first end of the shaft in contact with the inner cone assembly and with the shank and shoulder at a second end of the shaft extending outboard of the master outer cone assembly;

coupling an input yoke to the second end of the pinion drive shaft between the outer cone assembly and the shank putting the input yoke in contact with the outer cone assembly;

engaging a preloading tool into engagement with the input yoke until reaching a specified clamp load corresponding to a desired pinion bearing preload condition and measuring the corresponding distance A between the portion of preloading tool in contact with the input yoke and the shoulder of the pinion drive shaft;

measuring the difference B between the height of the master outer cone assembly and an outer cone assembly;

choosing a constant K to account for elasticity of the components; and determining the height H' of the preload spacer to by combining the value A and the value B and the value K.

9. The method of claim 8, further comprising:

removing the preloading tool, input yoke, and master outer cone assembly and press fitting the outer cone assembly onto the shaft.

10. The method of claim 5, wherein engaging the preloading tool comprises:

assembling an outer piece into engagement with the input yoke and an inner piece into engagement with the shoulder and applying an axial force to the input yoke until reaching a specified clamp load of 1000 lbs corresponding to a desired pinion bearing preload condition and measuring the corresponding distance A between the end of the preloading tool in contact with the input yoke and the shoulder of the pinion drive shaft.

* * * * *

UNITED STATES PATENT AND TRADEMARK OFFICE
CERTIFICATE OF CORRECTION

PATENT NO. : 6,736,544 B1  
DATED : May 18, 2004  
INVENTOR(S) : DeWald

Page 1 of 1

It is certified that error appears in the above-identified patent and that said Letters Patent is hereby corrected as shown below:

Column 9,  
Line 22, delete "an inner cup" and substitute -- the inner cup -- therefor.  
Line 22, delete "a housing" and substitute -- the housing -- therefor  
Line 23, delete "an outer cup" and substitute -- the outer cup -- therefor  
Line 25, delete "an inner cone" and substitute -- the inner cone -- therefor  
Line 25, delete "a shaft" and substitute -- the shaft -- therefor  
Lines 25-26, delete "a pinion drive shaft" and substitute -- the pinion drive shaft -- therefor  
Lines 29-30, delete "a first end" and substitute -- the first end -- therefor  
Lines 31-32, delete "a second end" and substitute -- the second end -- therefor.  
Line 34, delete "an input yoke" and substitute -- the output yoke --

Column 10,  
Lines 11-12, delete "an outer cone assembly" and substitute -- the outer cone assembly -- therefor  
Line 16, delete "to"  
Line 23, delete "claim 5" and substitute -- claim 8 -- therefor Signed and Sealed this Twenty-seventh Day of July, 2004

JON W. DUDAS  
*Acting Director of the United States Patent and Trademark Office*